United States Patent
Choy

(10) Patent No.: US 6,321,374 B1
(45) Date of Patent: *Nov. 20, 2001

(54) APPLICATION-INDEPENDENT GENERATOR TO GENERATE A DATABASE TRANSACTION MANAGER IN HETEROGENEOUS INFORMATION SYSTEMS

(75) Inventor: David Mun-Hien Choy, Los Altos, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,723

(22) Filed: Nov. 7, 1997

(51) Int. Cl.$^7$ .................................................... G06F 13/00
(52) U.S. Cl. ...................................... 717/2; 707/2
(58) Field of Search ................... 707/102, 104, 707/103, 533, 202, 10, 2, 3, 100, 201; 364/222; 345/340, 326, 113; 706/45, 46, 60; 709/226, 303, 103, 200; 370/352; 705/3, 2; 717/1, 2

(56) References Cited

U.S. PATENT DOCUMENTS

| | | | |
|---|---|---|---|
| 4,551,721 | 11/1985 | Kozlik | 340/825.52 |
| 4,689,786 | 8/1987 | Sidhu et al. | 370/255 |
| 4,727,475 | 2/1988 | Kiremidjian | 710/104 |
| 4,773,005 | 9/1988 | Sullivan | 710/9 |
| 5,058,000 | 10/1991 | Cox et al. | 707/10 |
| 5,097,533 | 3/1992 | Burger et al. | 364/226 |
| 5,115,501 | 5/1992 | Kerr | 707/9 |
| 5,129,086 | 7/1992 | Coyle, Jr. et al. | 395/682 |
| 5,150,464 | 9/1992 | Sidhu et al. | 709/222 |
| 5,166,931 | 11/1992 | Riddle | 370/401 |
| 5,182,705 | 1/1993 | Barr et al. | 705/4 |
| 5,216,592 | 6/1993 | Mann et al. | 705/8 |
| 5,237,614 | 8/1993 | Weiss | 713/159 |
| 5,265,252 | 11/1993 | Rawson, III et al. | 364/239 |
| 5,278,978 | 1/1994 | Demers et al. | 707/101 |
| 5,287,103 | 2/1994 | Kasprzyk et al. | 340/825.25 |
| 5,301,320 | 4/1994 | McAtee et al. | 705/9 |
| 5,319,543 | 6/1994 | Wilhelm | 705/3 |
| 5,327,529 | 7/1994 | Fults et al. | 345/335 |
| 5,353,401 | * 10/1994 | Iizawa et al. | 717/1 |
| 5,355,375 | 10/1994 | Christensen | 370/407 |
| 5,408,652 | 4/1995 | Hayashi et al. | 707/1 |
| 5,414,843 | 5/1995 | Nakamura et al. | 707/104 |
| 5,414,847 | 5/1995 | Tsukakoshi | 705/1 |

(List continued on next page.)

FOREIGN PATENT DOCUMENTS 0 624 964 A1    11/1994   (EP) .
0 682 318 A1    11/1995   (EP) .

OTHER PUBLICATIONS

Manua, Bootstrap and Autoconfiguration (BOOTP, DHCP), Chapter 21, pp. 365–379.

(List continued on next page.)

Primary Examiner—Jack Choules
(74) Attorney, Agent, or Firm—Merchant, Gould, Smit, Edell, Welter & Schmidt

(57) ABSTRACT

A heterogeneous information system such as a digital library often uses a database manager together with other data resource manager(s), such as an object server or a video server, to manage digital content. Such a system often needs to maintain an application-specific database and/or to handle application-specific operational requirements. To facilitate system integration and application development, an application-independent reusable product is created which generates a custom system component or utility, such as a loader, according to a specification provided by a system integrator or an application developer.

29 Claims, 5 Drawing Sheets

U.S. PATENT DOCUMENTS

| | | | |
|---|---|---|---|
| 5,434,918 | | 7/1995 | Kung et al. .......................... 713/169 |
| 5,446,897 | | 8/1995 | Mathias et al. ..................... 709/220 |
| 5,455,903 | * | 10/1995 | Jolissaint et al. .................... 345/418 |
| 5,455,948 | | 10/1995 | Poole et al. .......................... 707/102 |
| 5,465,330 | | 11/1995 | Komatsu et al. .................... 709/222 |
| 5,524,052 | | 6/1996 | Augustine et al. .................. 713/150 |
| 5,526,489 | | 6/1996 | Nilakantan et al. ................. 709/228 |
| 5,535,332 | | 7/1996 | Ishida ................................... 364/225 |
| 5,535,336 | | 7/1996 | Smith et al. ......................... 709/255 |
| 5,535,389 | | 7/1996 | Elder et al. .......................... 395/712 |
| 5,548,506 | | 8/1996 | Srinivasan ........................... 364/226 |
| 5,550,984 | | 8/1996 | Gelb ..................................... 709/245 |
| 5,581,691 | | 12/1996 | Hsu et al. ............................. 714/45 |
| 5,617,540 | | 4/1997 | Civanlar et al. ..................... 709/227 |
| 5,630,069 | | 5/1997 | Flores et al. ......................... 705/7 |
| 5,632,022 | * | 5/1997 | Warren et al. ....................... 345/350 |
| 5,668,952 | | 9/1997 | Slane .................................... 709/245 |
| 5,701,461 | | 12/1997 | Dalal et al. ........................... 707/4 |
| 5,781,552 | | 7/1998 | Hashimoto ........................... 370/103 |
| 5,787,413 | * | 7/1998 | Kauffman et al. ................... 707/2 |
| 5,799,310 | * | 8/1998 | Anderson et al. ................... 707/102 |
| 5,802,524 | | 9/1998 | Flowers et al. ...................... 707/103 |
| 5,806,061 | * | 9/1998 | Chaudhuri et al. .................. 707/3 |
| 5,809,145 | | 9/1998 | Slik et al. ............................. 705/52 |
| 5,812,668 | | 9/1998 | Weber ................................... 705/79 |
| 5,832,499 | | 11/1998 | Gustman .............................. 707/103 |
| 5,835,667 | | 11/1998 | Wactlar et al. ....................... 386/96 |
| 5,842,193 | * | 11/1998 | Reilly ................................... 706/45 |
| 5,854,901 | | 12/1998 | Cole et al. ............................ 709/245 |
| 5,870,763 | * | 2/1999 | Lomet ................................... 707/202 |
| 6,118,446 | * | 9/2000 | Jones et al. ........................... 717/2 |

OTHER PUBLICATIONS

R. Droms, Memorandum re: Dynamic Host Configuration Protocol, Bucknell University, Mar. 1997, (pp 1–45).

Finlayson, et al., Memorandum re: A Reverse Address Resolution Protocol,Stanford University, Jun. 1984, (pp 1–4).

Bill Croft et al., Memorandum re: Bootstrap Protocol (BOOTP), Sep. 1985, (pp1–12).

David C. Plummer, paper entitled An Ethernet Address Resolution Protocol or Converting Network Protocol . . . Ethernet Hardware, Nov. 1982, (8pp).

R. Agrawal, et al, Mining Sequential Patterns, IBM Almaden Research Center, pp. 1–12, Mar. 1995.

R. Srikant, et al., Mining Sequential Patterns: Generalizations and Performance Improvements, IBM Almaden Research Center, pp. 1–15, Mar. 1996.

D. Hollingsworth, Workflow Management Coalition—The Workflow Reference Model, Document No. TC00–1003, pp. 1–44, Nov. 28, 1994.

A.L. Scherr, A New Approach To Business Processes, IBM Systems Journal, vol. 32, No. 1, pp. 80–98, 1993.

C. Mohan, et al., Exotica: A Research Perspective On Workflow Management Systems, Data Engineering, vol. 18, No. 1, pp. 1–6, Mar. 1995.

A.V. Aho, The Transitive Reduction Of A Directed Graph, SIAM J. Comput, vol. 1, No. 2, pp. 131–137, Jun. 1972.

F. Leymann, et al., Managing Business Processes As An Information Resource, IBM Systems Journal, vol. 33, No. 2, pp. 326–348, 1994.

The NFS™ Distributed File Service, NFS White Paper, Mar. 1995.

IBM ImagePlus VisualInfo Information and Planninhg Guide, 1994 and 1995.

IBM ImagePlus VisualInfo Application Programming Reference, vol. 1, pp. 1–46, 1993–1995.

ERwin/Navigator User's Guide, pp. 1–7, 1996.

I. Kojima et al., Implementation of an Object–Oriented Query Language System . . . Interface, IEEE, 1991, pp 79–86.

A. Dogac et al., A Multidatabase System Implementation on CORBA, IEEE, 1996, pp 2–11.

J.T. Anderson et al., Generic Database Interface (GDI) User Manual, Special Technical Report, Feb. 25, 1994.

IBM Digital Library, Application Programming Guide of AIX and IRIX, Version 1, Document No. SC26–8654–00, pp. 1–134, 1996.

IBM Digital Library, Integrating Multimedia Server for AIX, Version 1, Document No. GC26–8872–01, pp. 1–23, 1996.

IBM Database 2, SQL Reference For Common Servers, Version 2, pp. 25–75, 1994–1995.

* cited by examiner

Catalog table (one for each object type)

APPLICATION-INDEPENDENT GENERATOR TO GENERATE A DATABASE TRANSACTION MANAGER IN HETEROGENEOUS INFORMATION SYSTEMS

CROSS-REFERENCE TO RELATED APPLICATIONS

This application is related to application Ser. No. 08/936,172, U.S. Pat. No. 6,021,410, entitled "AN EXTENSIBLE DIGITAL LIBRARY", filed Sep. 25, 1997, by David Mun-Hien Choy, assigned to IBM Corporation, and having which application is incorporated by reference herein.

BACKGROUND OF INVENTION

1. Field of the Invention

Providing a method to facilitate system integration and application/solution development for heterogeneous information systems is valuable. It is also valuable to have a re-usable tool to generate application-specific programming interfaces (APIs) and utilities for loading and accessing heterogeneous information.

This invention relates to an improved method of handling heterogeneous information.

Except for limited cases, it is almost impossible to design a generic database that is suitable for all digital library applications. Thus, a replicable digital library solution would not be able to offer a generic "library", and specific data loading and access software has to be developed for/by each customer.

This invention is directed to a re-usable tool which generates application-specific software for each digital library application. This should significantly reduce costs.

2. Description of Related Art

System integration and application development are major undertakings for building heterogeneous information systems such as digital libraries. A digital library application typically handles a large amount of both structured information (e.g., bibliographic data, catalog data, structured documents, business data) and unstructured information (e.g., image, text, audio, video). To leverage off-the-shelf technologies, each form of data is usually managed by a separate, specialized resource manager. For example, a database management system (DBMS), such as DB2 (™), may be used to manage structured data; an object repository system, such as ADSM™, may be used to manage image and text; a stream-data server, such as TigerShark (™), may be used to manage audio and video.

To manage these data properly for a digital library application, a customized data model is frequently required, involving application-specific tables, attributes, structures, relationships, constraints, semantics, and optimization. In many cases, a digital library application is an extension of a customer's existing database and production application. In other cases, it is a component of the customer's overall information technology vision. Thus the data management requirements can be much broader than those of the digital library application alone. For these reasons, the data model requirements are often different even between two similar digital library applications within the same industry.

In the publishing industry, for example, a publisher typically designs its own proprietary database to maintain its bibliography and content data for producing new, electronic products. There are also reported cases that different organizations within a large enterprise require different metadata on the same data. Therefore, it is not possible to pre-design a fixed data database that can support all digital library applications, except for the case where a relatively simple and generic model is sufficient, for instance, VisualInfo (™).

Without a common data model, software vendors/developers are not able to produce re-usable software, namely applications, middleware, tools, or utilities, that access a large amount of information efficiently. Although it is sometimes possible for an application to dynamically "discover" the data model from a "bootstrap" model, the performance of such an approach would not be acceptable and the restrictions would be severe. Furthermore, for a DBMS that supports query compilation, e.g., DB2 (™), a target database is needed for software compilation and it must be distributed together with compiled software.

Even if a common data model is possible, the model would mask the underlying resource managers thereby preventing a full utilization of the resource manager capabilities. For instance, version support in ADSM (™) for objects and retention management capability. In fact, the common data model would "freeze" the data management technologies, preventing further exploitation of new capabilities in the future. In theory the higher-level data model can be extended when an underlying resource manager is enhanced. This is not practical because of the multitude of many resource managers, and in fact it is not always possible because the higher-level model would not be able to reflect all lower-level capabilities. For this reason, many application developers and system integrators prefer using the application programming interfaces (APIs) of the resource managers directly, especially standardized API such as SQL.

Moreover, an essential operation for a digital library, (and for many other heterogeneous information systems) is to load information into the library. Typically performed by authorized workers, this operation is frequently high-volume, batch-oriented and performance-sensitive. It usually requires a proper coordination among the separate operations against the underlying resource managers in order to avoid inconsistencies. Such coordination is similar to the data synchronization required for distributed data processing, in which case techniques such as "two-phase commit" are well-known. However, most resource managers used by a digital library do not have a two-phase-commit capability.

On the other hand, a rigorously synchronized operation that is required for on-line transaction processing (OLTP) is not necessarily appropriate for digital libraries. For example, to protect against failure during batch updates (e.g., loading data), a restart capability relying on redundancy available outside the digital library system (e.g., content source files) can be equally effective but much more efficient than a conventional transaction-rollback followed by a rollforward using a complete transaction log.

Asynchronous operations are not only acceptable but also frequently preferred. The following are a few motivations:

1. The DB2 (Version 2) Load Utility, which does not allow record-level synchronization, is much more efficient than individual insertion of records.
2. Full-text indexing of text objects is usually much more efficient if performed in batch (asynchronous with object insertion) than performed individually (synchronized with insertion).
3. Synchronous indexing of text objects also leads to long DBMS transactions which degrade DBMS performance due to locking.
4. Recoverable deletion (required to support transaction rollback) of a large object can be very expensive unless the resource manager provides an efficient support. Most object repositories, such as ADSM (™), do not. On the other hand, non-recoverable deletion is acceptable for many digital library applications.

5. For ADSM (™), retention management can be used more efficiently and effectively to delete old "versions" of objects than to delete them individually and explicitly.

To support asynchronous, but coordinated, operations, a multi-state consistency model is usually a better transaction model for a unit of work than the binary model ("all done" or "all not done"), which is appropriate for OLTP. On the other hand, the "nested transaction" model that is suitable for engineering design and other long-duration applications is not sufficient for digital libraries, since there is often no pre-determined ordering of the coordinated operations, and furthermore, parallelism is preferred when possible.

Besides asynchronous operations, many digital library applications actually have special consistency requirements (e.g., whether "orphan" objects are allowed) and operational requirements (e.g., whether inserting an already existed object constitutes an error, and how to handle such a condition). To fit all these requirements into a fixed paradigm of transaction and constraint, if this is possible, many artificial work-arounds for resource managers would be needed. Furthermore, data loading is an integral part of the content creation/capture/import process, which undoubtedly varies with each application because of the diverse content sources and creation/capture tools. While some applications load data from files, others prefer data loading from buffer (e.g., after performing image enhancement, watermarking, compression, or encryption). Still others need to import removable media (e.g., CD-ROMs) with ready-to-use contents that are either too costly to copy (namely, load into the digital library storage) or can not be legally copied due to copyright constraints.

Because of these many dependencies on the application, custom software is usually needed for accessing digital library data. However, transaction management requires systems skills that many application developers (who typically focus on information capture and distribution) are reluctant to invest in. Moreover, the developers also need working knowledge to handle any unique feature or constraint a resource manager may have. For example, ADSM (™) requires a transaction COMMIT after every deletion or after a certain number of insertions. This requires special treatments to maintain a coordinated transaction and to accomplish a rollback.

To simplify application development, a common approach is for a system or middleware developer to provide an API that hides systems logic and subsystem interfaces. Lacking a common data model and common transaction semantics, it is difficult to define an API that is suitable for many applications. Although in principle an API can continually grow to become "more complete". This is not feasible since there are unlimited number of cases to consider, and in the meantime the API becomes increasingly more expensive to maintain, harder to use, and creating a bigger compatibility burden down the road.

Without a way to produce re-usable software to access (load, update, retrieve, delete) data stored in a digital library, except for the limited case where a generic data and transaction model is sufficient, custom software has to be developed for each application to coordinate resource managers. This process is expensive and time- consuming and it requires some systems skills.

SUMMARY OF INVENTION

The invention seeks to minimize the problems of the prior art, and provide advantages of existing system for handling heterogeneous data.

The invention includes a solution for an application-specific relational database and an object repository in which each object is accessed by an object ID. In other inventive aspects additional resource managers can be handled in a similar manner.

The invention facilitates system development for an application-specific relational database having a database resource manager, and an associated resource manager.

An application-independent product according to a specification provided by a system developer is created. Such product is independent of and is for interfacing with the database resource manager and the associated resource manager. The associated resource manager can have at least one of (b) an object repository wherein objects are accessed by an object identification, and have an object resource manager, or (c) a stream data base having a stream data base resource manager.

The invention includes the provision of an application-specific API and/or utility to facilitate system integration and application/middleware development. The invented solution creates an application-independent re-usable tool which can generate a customized API or utility.

The invented generated API and utility follows a generic "Cataloged Object" model to coordinate changes (insertion, deletion, and update) to the object repository and to the portion of the database that references these objects. The DBMS API (typically SQL) and the object repository API, however, remain accessible with their capabilities fully available, and can be used for retrieval and for update to other parts of the database.

Thus, the generated API and utility, hereafter called the "Cataloged Object API" and the "Cataloged Object Utility" respectively, augments the resource manager APIs, not replacing or masking them. This generated API is otherwise self-sufficient. Data integrity for exposing multiple APIs (the SQL API and the Cataloged Object API) is not an issue since the "users" of these APIs are cooperative components/utilities of the digital library system, not ordinary users.

DETAILED DESCRIPTION OF THE INVENTION

Figure 1:
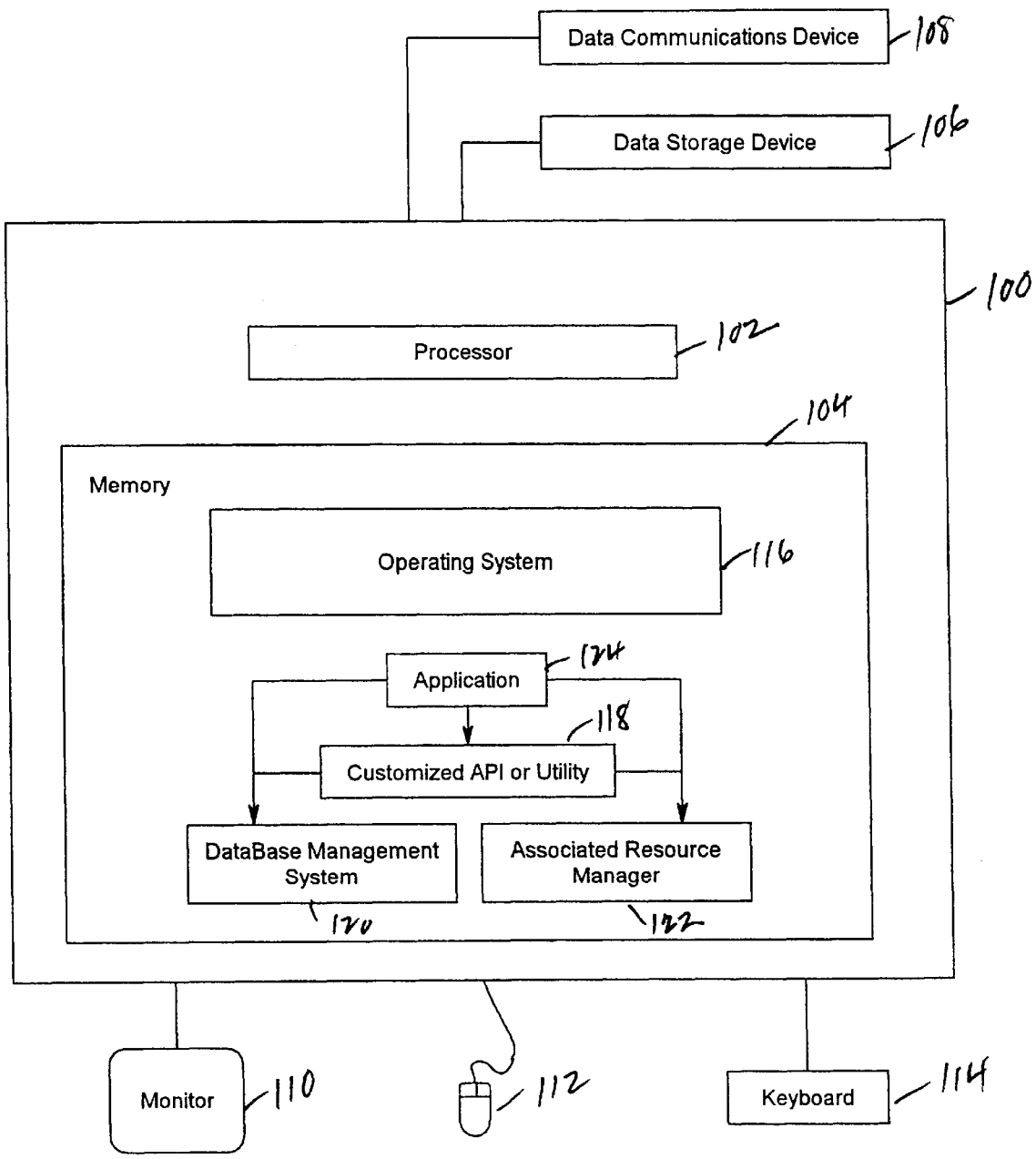
FIG. 1 is an exemplary hardware environment used to implement the preferred embodiment of the invention, and illustrates the main characteristics of the system having a customized API or Utility in relation to a base management system and an associated resource manager.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment

FIGS. 1, 2, 4 and 5 show an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 116, such as OS/390, MVS, OS/2, AIX, UNIX, Windows, etc. The operating system 116 is booted into the memory 104 of the computer 100 for execution when the computer 100 is powered-on or reset. In turn, the operating system 116 then controls the execution of one or more computer programs by the computer 100. The present invention is generally implemented in these computer programs, which execute under the control of the operating system 116 and cause the computer 100 to perform the desired functions as described herein. Alternatively, the present invention may be implemented in the operating system 116 itself.

The operating system 116 and computer programs are comprised of instructions which, when read and executed by the computer 100, causes the computer 100 to perform the steps necessary to implement and/or use the present invention. Generally, the operating system 116 and/or computer programs are tangibly embodied in and/or readable from a device, carrier, or media, such as memory 104, data storage devices 106, and/or a remote device coupled to the computer 100 via the data communications devices 108. Under control of the operating system 116, the computer programs may be loaded from the memory 104, data storage devices 106, and/or remote into the memory 104 of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIGS. 1 through 5 is not intended to limit the present invention. Indeed, those skilled in the art will recognize that other alternative hardware environments may be used without departing from the scope of the present invention.

Cataloged Object Model

As illustrated in FIG. 1, the generated API and/or utility identified by 118 follow a generic "Cataloged Object" model to coordinate changes, for instance, insertion, deletion, and update, to the object repository and to the portion of the database that references these objects. The DBMS 120 provides a relational database API, and the Associated Resource Manager 122 provides an object repository API. The DBMS 120 and the Associated Resource Manager 122 remain accessible with their capabilities fully available, and can be used for retrieval and for update to other parts of the database. The generated API and utility 118, hereafter called the "Cataloged Object API" and the "Cataloged Object Utility", respectively, augment the respective resource manager APIs. The generated API and utility 118 is otherwise self-sufficient. Data integrity for exposing multiple APIs, namely the DBMS API and the Cataloged Object API, is not an issue since the "users" of these APIs, i.e., the application 124, are cooperative components/utilities of the digital library system, not ordinary users.

In an optional configuration, there can be additional data base management systems. There can also be multiple object repositories, for instance, a stream-data repository. The path for the information access from other components to the generated API and/or utility 118 is a control path, which in certain situations can also carry data.

Cataloged Object Utility

A Cataloged Object Utility, in contrast to a conventional task-specific utility (e.g., a loader), is a multi-function utility which takes both operations and data from a file. Although the Cataloged Object API and the Utility mainly provide a service to coordinate updates, they also support retrieval, providing a simpler operation that is consistent with the update operations and that can be performed in batch, as well as masking any "peculiarities" that the underlying resource-manager API may have (e.g., the backup/archive semantics of ADSM (™)). Using the Utility, a customer can load a large volume of information efficiently into a digital library without writing a custom loader program.

Figure 2:
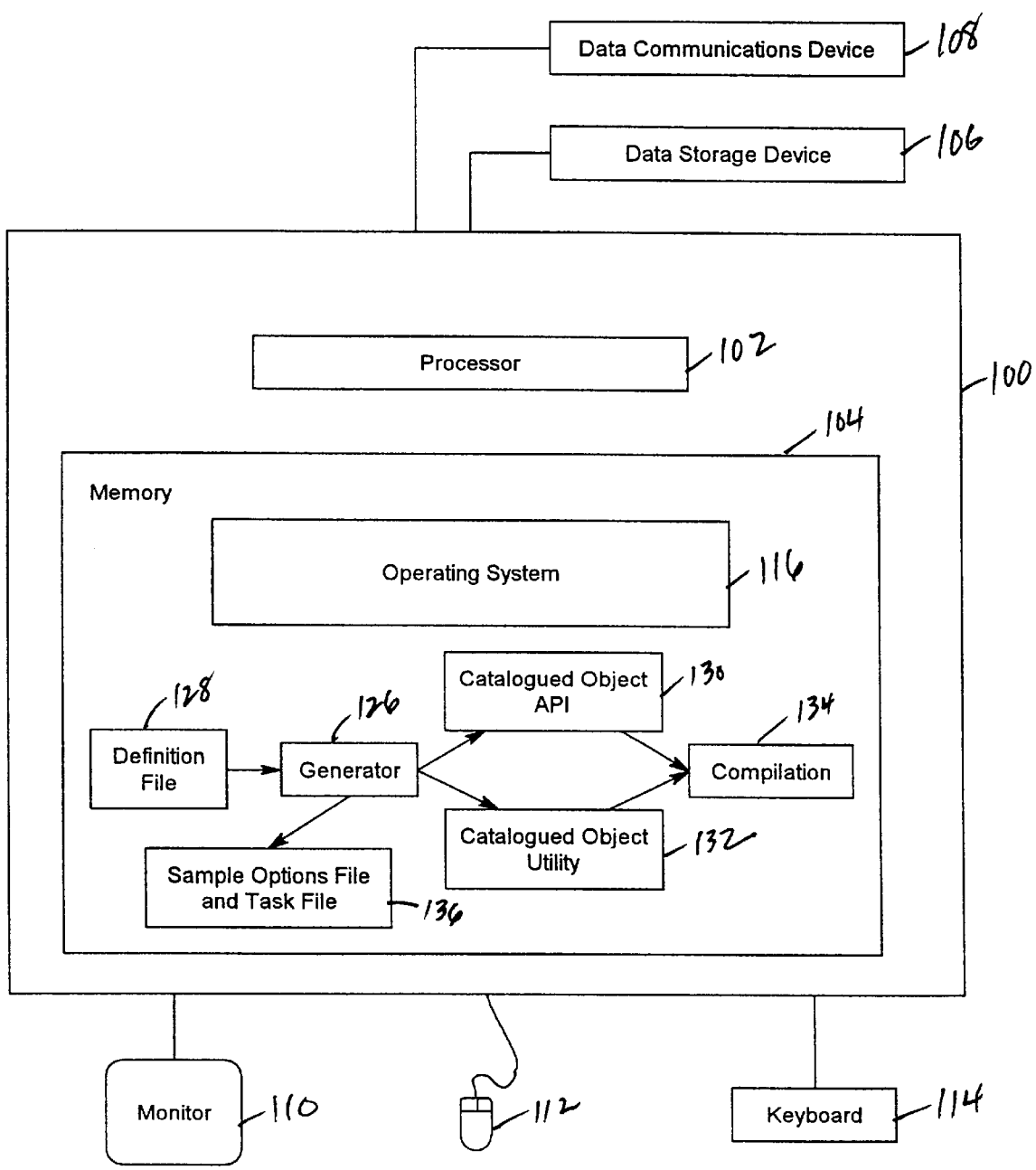
FIG. 2 is an exemplary diagram illustrating the cataloged Object API and/or Cataloged Object Utility in relation to other functional elements of the invention.

As can be seen in FIG. 2, there is provided a re-usable tool, hereafter called the Generator 126. This can be packaged with a digital library product or solution, such as VisualInfo (™), or as a toolkit that can be separately marketed or used by system integrators. The digital library system integration procedure (or installation/configuration procedure, depending on how software is packaged) includes the following steps in addition to the usual steps:

1. Design and create a database appropriate for the target application possibly with the aid of sample digital library databases distributed with the Generator 126 and database design tools that are commonly available.
2. Create a Definition File 128 (e.g., using a text editor) to define object types under the Cataloged Object model, canned queries, transaction semantics and options, default settings and other specifications.
3. Invoke the Generator 126 to create a Cataloged Object API 130 and/or a Cataloged Object Utility 132 from the Definition File 128. SQL-precompile this API 130 and Utility 132 if DB2 is used as the DBMS. Then language-compile and link the API 130 and Utility 132 at 134.
4. The generated Utility 132 can be readily used to access (e.g., load) objects. The generated API 130 can be called by other component of the system or application to access objects.

If later the application is to be expanded, such as adding new object types or queries, or changing transactional requirements or defaults, the Definition File 126 can be changed accordingly and this API 130 and Utility 132 can be re-generated and re-compiled. It is not necessary to change the application, unless object types are re-defined.

The "Cataloged Object" Model

The Cataloged Object model is an "execution" model in the sense that it is applied only when an operation under this model is performed. It is described with reference to FIG. 3. It does not prescribe any static constraint (e.g., referential integrity) that is to be maintained permanently. Such constraints can be achieved by controlling the operations and accesses through this and other APIs. Under this model, one or more types of "cataloged object" are defined by the application developer in a Definition File 128. For each object type, a specific table in the database is named as its catalog table 138. This table 138 has a primary-key attribute 140 (pertaining to the relational database), a separate object-ID attribute 142 (which, when not null, references an object 144 stored in the object repository), optional control attributes 146, and other attributes 148 as needed by the application. Except for the control attributes 146, which must have proper data types, there is no restriction on the table name, attribute name, and data type. The object-ID attribute 142 is normally specified. It is not required if objects 144 are stored in the database (e.g., in a LONG-VARCHAR attribute) instead of in the object repository. A surrogate object type can also be defined without an object-ID attribute 142 to allow canned queries executed against a database table by the Utility (e.g., to update a status table synchronously with data loading).

Figure 3:
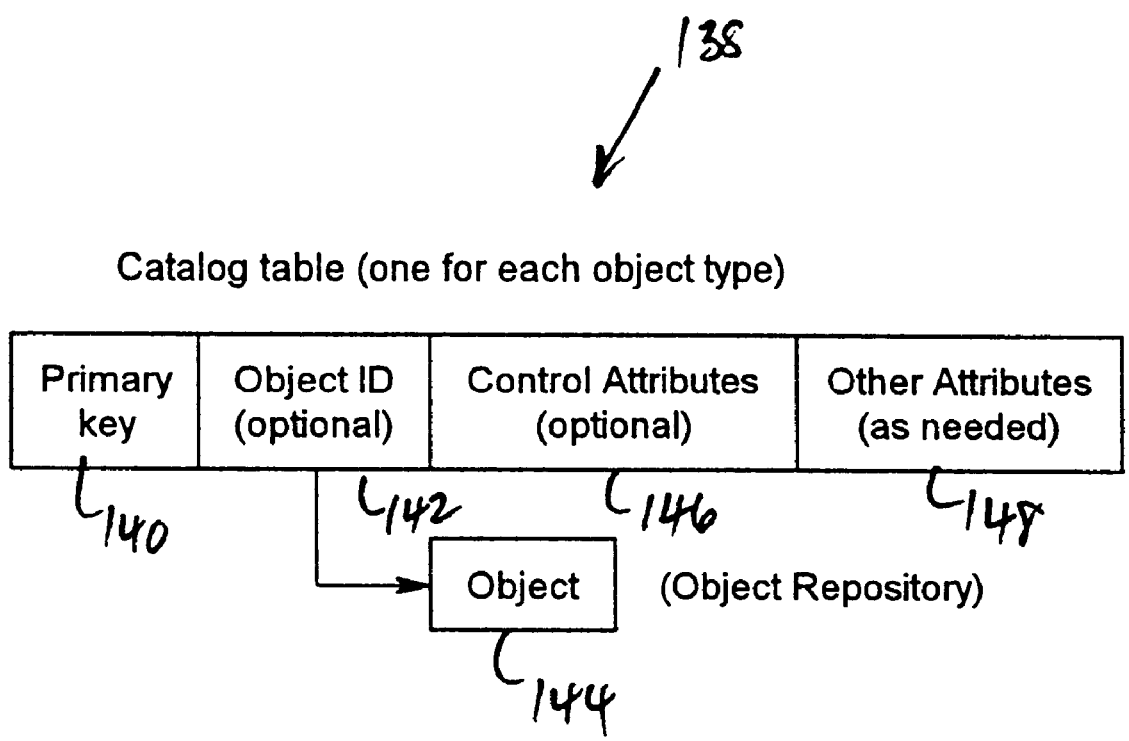
FIG. 3 is an exemplary diagram of a Catalog Table, one of which is needed for each object type.

FIG. 3 illustrates the preferred, and simpler, case that no two object types share a catalog table 138. The small extension needed to support shared catalog tables 138 is described later. Referential requirements between the object-ID attributes 142 and the referenced objects 144 is maintained by the generated API 130 and Utility 132 according to the specified operational semantics. For example, this can be whether "orphan" objects are allowed through this API 130 and Utility 132. The database may contain additional tables 138 outside this model, i.e., unknown to the generated API 130 and Utility 132. Similarly, the object repository may contain "unCataloged" objects 140 that are inserted directly through its API.

The control attributes 146 are attributes maintained by the Cataloged Object API 130 and Utility 132. Normally, they are not to be updated by the application 124 or another software component. A control attribute 146 only appears in a catalog table 138 if one is named in the object-type definition. Below is a sample list of control attributes 146. Additional attributes 146 can be added to the list as needed.

| | |
|---|---|
| Timestamp of last insertion/update | (Data type: timestamp, nullable). |
| Object change sequence number (version) | (Data type: integer, nullable). |
| Object size | (Data type: integer. nullable). |
| Object source filename | (Data type: char string. nullable). |

Cataloged Object Operations

The basic operations for the Cataloged Object API 130 and Utility 132 include the following:

| | |
|---|---|
| ● BEGIN | Initialize the API 130 or Utility 132 (Connect to resource managers). |
| ● END | Terminate the API 130 or Utility 132 (Disconnect from resource managers). |
| ● OPTIONS | Set execution options (Ignored if issued from a Task File 136). |
| ● IMBED | Imbed another file (From a Task File 136 only, up to a certain maximum level of nesting). |
| ● LOG | Write a "user" log record to Log File. |
| ● STORE | Store a cataloged object (both object and catalog record). If the object source is a file, then the full filename is a concatenation of the source path prefix specified in the Definition File 128, the source path infix specified in the Options File 136, and the filename given by the STORE operation. The latter may also include a subdirectory path. |
| ● RETRIEVE | Retrieve a set of cataloged objects selected by a SQL predicate into the target directory as a set of files. The target directory is a concatenation of the path prefix specified in the Definition File 128, the path infix specified in the Options File 136, and the directory given by the RETRIEVE operation. The target filename is given by the control attribute "object source filename" if it is available. Otherwise, a suffix of the Object ID is extracted as the filename according to platform-specific rules (e.g., AIX filename, OS/2 filename, etc.). |
| ● UPDATE | Update a set of catalog records (selected by SQL predicate). |
| ● DELETE | Delete a set of cataloged objects (selected by SQL predicate). |
| ● DDELETE | This is a "destructive" (nonrecoverable) DELETE, i.e., it is not rolled back by a BACKOUT. This operation is usually more efficient than DELETE. |
| ● COMMIT | Commit all changes and end transaction. |
| ● BACKOUT | Roll back all changes (except DDELETES) and end transaction. |

In addition, there are operations to access the object repository alone, regardless of whether or not an object is "cataloged". They are useful for replacing objects, for administrative tasks, and for convenience since they can be executed by the Utility 132 (from a Task File 136) and can mask any special treatments that an, object repository API may require.

PUTOBJ Store an object into the object repository directly.

GETOBJ Retrieve an object from the object repository directly.

DELOBJ Delete an object from the object repository directly.

A unit of work, namely a transaction, under the Cataloged Object model is ended by either a COMMIT or a BACKOUT operation. These operations trigger the equivalent operations for the underlying resource managers to commit or roll back all the changes (except DDELETE). The rollback semantics is specified by the application developer. In the absence of a direct support of rollback by a resource manager, suitable compensation operations are performed to achieve a rollback.

A typical sequence of operations (in a Task File 136 or through successive API calls) is as follows:

BEGIN

OPTIONS

Mix of: STORE, DELETE, DDELETE, UPDATE, RETRIEVE, PUTOBJ,

DELOBJ, GETOBJ

COMMIT or BACKOUT

Mix of: STORE, DELETE, DDELETE, UPDATE, RETRIEVE, PUTOBJ,

DELOBJ.GETOBJ.

COMMIT or BACKOUT

END

The LOG and IMBED operations can appear anywhere in the sequence. The syntax for the corresponding API calls and their associated data structures is a direct mapping of the Task File 136 syntax to the target programming language and environment (e.g., C, C++).

The Cataloged Object Utility

Figure 4:
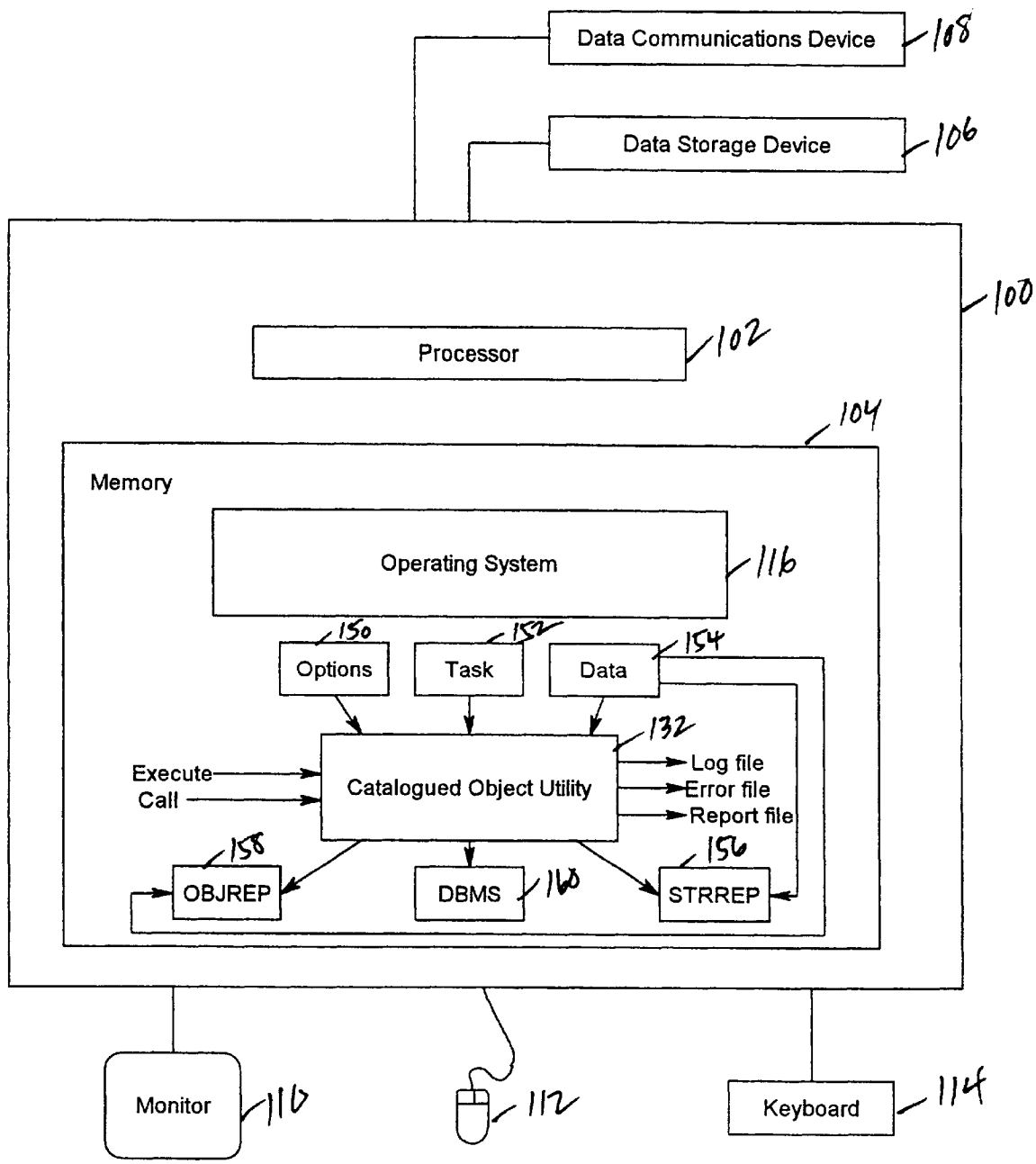
FIG. 4 is an exemplary hardware environment used to implement the preferred embodiment of the invention, and including a diagram of a Cataloged Object Utility in relation to other files a database manager, and an object repository.

The Cataloged Object Utility 132 configuration of the invention is illustrated in FIG. 4. The Utility 132 is a task-driven, batch-oriented utility that can be executed as a standalone program or as a callable routine. It takes input from an Options File 150, which specifies the execution options to be used, and from a Task File 152 which contains a sequence of operations to be executed together with their associated parameters and data or pointers to data.

To facilitate high-volume processing, each operation typically invokes a canned query prescribed in the Definition File 128. Objects and database long-field values , e.g., DB2 LONGVARCHAR value, may be stored in data files as source for insertion or as output of retrieval. Execution messages, log records, and report , e.g., statistics, are appended to an Error File, a Log File, and a Report File, respectively. Object content and long-field data are not recorded in the log. For convenience, a Task File 152 may imbed another Task File 152, up to a specified maximum level of nesting.

When the Utility 132 is used as a standalone program, the Task File 152 must contain a complete transaction or a sequence of nonoverlapping ones. When the Utility 132 is called as a routine, the Task File 152 can be executed in-line with other calls to this Utility 132, to the Cataloged Object API, or to other APIs such as the SQL API. In this case, a transaction can begin by an API call or by an operation in a Task File 152, and end by a COMMIT or BACKOUT API call or a COMMIT or BACKOUT operation in another Task File 152. If necessary, e.g., to perform an administrative housekeeping task, an uncoordinated commit or rollback can be performed by calling the resource manager APIs directly and separately.

Using the Utility 132, a customer can start production data-loading into the digital library and to retrieve objects from it, by preparing Task Files 152 and one or a few reusable Options File(s) 150 without writing any program to access the digital library.

FIG. 4 also shows an optional path from the Data Files 154 for the data and a Stream Data Respository 156, and the Object Repository 158, which supplement the DBMS 160.

The Cataloged Object API

Figure 5:
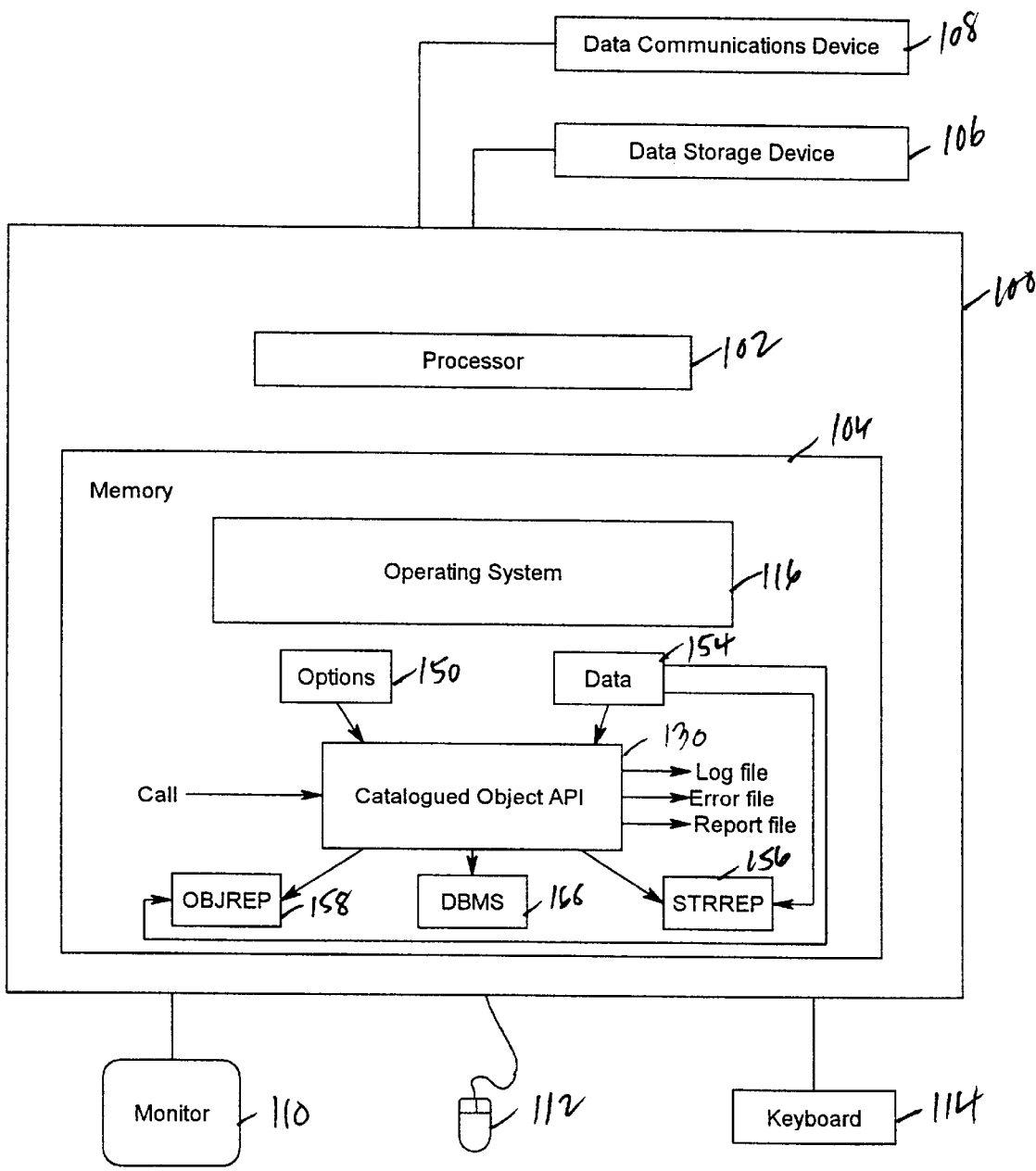
FIG. 5 is an exemplary hardware environment used to implement the preferred embodiment of the invention, and including a diagram of a Cataloged Object API in relation to other files a database manager, and an object repository.

The Cataloged Object API 130 is illustrated in FIG. 5, and is similar to the Utility 132, except that it is called by another routine to execute one operation at a time. The operation can be executed in-line with other calls to this API 130, to the Utility 132, or to other APIs. Parameters and data values are passed by data structure in memory. Objects and long-field values are passed either by buffer or by files. For the former, a value can be passed in multiple segments, one byte-string at a time. Messages, log records, and report are appended to an Error File, a Log File, and a Report File respectively. Likewise, object content and long-field data are not recorded in the log. A report is only produced by the COMMIT or BACKOUT call. The OPTIONS call can be used to set execution options before a transaction is started. The option settings can be passed in buffer or read from an Options File 150.

FIG. 5 also shows an optional path from the Data Files 154 for the data and a Stream Data Respository 156, and the Object Repository 158, which supplement the DBMS 160.

Usage and Extension

The Options File 150 specifies a variety of execution options, including execution modes and the handling of object existence conditions. These options can be used for many different situations. For example, to "load" objects that are already in the Object Repository 158, such as importing media that contains ready-to-use objects, e.g., CD-ROM, a catalog-only execution mode can be selected in the Options File 150.

If a failure occurs during data-loading from a Task File 152, the Task File 152 can be re-executed with object-existence handling in the Options File 150 set to OK. This is much simpler and more efficient than a conventional recovery procedure based on transaction rollback.

The Generator 126 can progressively support, namely generate code for, more resource managers and platforms. This not only accommodates more applications, e.g., a customer may require the integration with an already existed Oracle (™) database, but also provides a migration path to accommodate application growth. For example, a relatively small application can use a file system as an object repository and switch to ADSM (™) when capacity grows. In this case, the same API 130 and Utility 132 can be re-generated to access the new Object Repository 158 without the need to change application 124.

This method of system integration is relatively immune to database expansions, and it accommodates application growth very well. Adding new tables to the database does not affect the generated API 130 and Utility 132. New Cataloged-object types and canned queries can be added by updating the Definition File 128 and generating a new API 130 and Utility 132. There is no need to change existing application software that do not use the new-queries. Multiple applications 124 may share the same database, each having a disjoint set of catalog tables 138, a separate Definition File 128, and independently generated application-specific API 130 and Utility 132. To support multiple object repositories for an application 124, the object ID 142 can be prefixed with the repository name, or alternatively, a separate repository-name attribute can be added. If each object type only uses one repository, the binding of object type to repository can be specified in the Definition File 128.

If needed, a higher-level API can still be implemented above the resource manager APIs and the Cataloged Object API 130 to support applications 124 to provide a suitable data model and access control. The Cataloged Object API 130 does not impose any restriction or unnecessary overhead because it only augments the resource manager APIs.

To allow multiple object types to share the same catalog table, e.g., a document may associate with an image object as well as an OCR-text object, each object type must have a separate Object-ID attribute 142 and separate, optional, control attribute 146. The existence handling for catalog record should be specified properly in the Options File 150 to allow the first object-insertion to insert the catalog record and subsequent object-insertions to update the catalog record.

The Generator 126 can be leveraged to generate additional logic. The following are some examples:

1. When loading a text object, the Utility 132 can create an augmented object that includes frequently searched attributes to be used for text-indexing. This enables a text-search engine to perform attribute search as well as text search, thereby avoiding a potentially expensive step of merging long lists of search results from two resource managers.
2. A new operation can be added to perform content-indexing for an object.

3. Another utility can be generated for checking referential integrity, listing orphans, collecting statistics, etc.
4. Application-specific logic or rules for access control, rights management, e.g., watermarking, pricing model, usage metering, content distribution, e.g., caching scheme, triggers and workflow, etc., can be generated as well.

This invention is applicable to any heterogeneous information system where application-specific APIs or utilities are needed.

CONCLUSION

The invention allows the development and deployment of re-usable storage management software for digital libraries, and other heterogeneous information systems, without imposing a fixed data model and transaction paradigm. It reduces development and maintenance costs as well as reduces skill requirement when a pre-defined model is not suitable.

A fixed pre-defined model usually carries the following inherent burdens: versatility of the model to a wide range of applications; performance overhead, for normal processing as well as or failure recovery; restriction to application growth and extension; and barrier to exploitation of new technologies.

Contrarily with the invention, any resource manager is accommodated, and it is open to new resource management technologies. No change to resource manager is needed. Resource Manager APIs remain available to system integrator and application/middleware developer. Full capabilities, including subsequent enhancements to resource managers can be exploited. Escape from any imposed performance overhead is achieved.

By automatic generation of application-specific API and utility to augment resource manager APIs, it accommodates custom data model and pre-existed database. Custom transaction semantics, constraints, and operational scenario is supported. Unique resource-manager capabilities (e.g., static SQL, non-recoverable delete, fast restart) are utilized to optimize performance. An alternate API for resource manager to simplify accesses, namely no need for application programmer to learn the intricacies of specific resource managers, is possible. Application expansion/growth, e.g., adding tables and canned queries, replacing object repository is facilitated. The burden of upward compatibility down the road is minimized.

Using the utility, a customer only needs to prepare data files to load content efficiently. Development of custom loader software is not required.

This invention does not provide a "complete" data model nor a "complete" API, and does not introduce another access control mechanism. The generated API is intended for system integration and application/middleware development, i.e., to facilitate access by cooperative software components, not for user access. The generated utility, on the other hand, allows authorized workers to load/access large amounts of content efficiently without the need to develop custom software.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. A method of facilitating development for a customized information system wherein the information system utilizes:
   (a) a data base resource manager; and
   (b) an at least one other resource manager,
   the method comprising:
      providing an application-independent, re-useable generator that is based upon defined parameters, the generator being independent of the data base resource manager and the at least one other resource manager, and
      generating a database transaction manager object according to a specification provided by a system developer using the generator, the database transaction manager object being configured for specific use with the data base resource manager and the at least one other resource manager.

2. The method of claim 1 wherein the database resource manager is a relational database management system.

3. The method of claim 1 wherein the at least one other resource manager including at least one of:
   an object repository wherein objects are accessed by object identifications,
   a stream data server,
   a special-purpose information system, and
   a database resource manager.

4. The method of claim 1, wherein the database transaction manager object follows a generic model for coordinating changes to data resources managed by the at least one other resource manager and to a portion of a database that references other data resources.

5. The method of claim 4 wherein the generating the database transaction manager object further comprises:
   permitting definition of at least one type of Cataloged object by an application developer,
   naming, for each object type, a specific table in a database as its catalog table,
   providing an optional object-identification attribute in each catalog table, and
   providing optional control attributes as needed by application.

6. The method of claim 5 wherein referential requirements between the object identification attribute and the referenced objects are maintained by the database transaction manager object.

7. The method of claim 5 wherein object types do not share catalog table.

8. The method of claim 5 wherein the control attributes are attributes maintained by the database transaction manager object, and wherein a control attribute appears in a catalog table if named in the object-type definition, and wherein the control attributes may include one of the following:
   timestamp of insertion,
   timestamp of last update,
   object change sequence number,
   object size, or
   object source filename.

9. The method of claim 8 wherein the database transaction manager object permits loading of information into the system without writing a custom loader program.

10. The method of claim 5 wherein multiple object types share a catalog table.

11. The method of claim 5 wherein the database transaction manager object includes means for performing at least some of the following operations:

initialize for execution, terminate execution, set execution options, imbed another file in an input file, write a "user" log record, store a Cataloged object or its catalog record, replace a cataloged object or its catalog record, update a set of catalog records, retrieve a set of cataloged objects or their catalog records, delete a set of cataloged objects or their catalog records, nonrecoverably delete a set of Cataloged objects or their catalog records, commit changes, and roll back changes.

12. The method of claim 5 wherein the database transaction manager object further comprises an application programming interface (API) for each operation supported by the database transaction manager object wherein the API is individually callable by other components of the information system.

13. The method of claim 1 wherein the database resource manager provides an application programming interface (API), and the at least one other resource manager provides an at least one API, and wherein the respective managers are accessible and usable for retrieval and for update of their respective data resources, such that the database transaction manager object augments the API for the database resource manager and the at least one API for the at least one other resource manager.

14. The method of claim 14 wherein the database transaction manager object is multifunctional thereby being operable to take execution options, sequence of operations, and their associated parameters and data from at least one input.

15. The method of claim 14 including means for taking input from at least one file.

16. The method of claim 14 including means for taking input from memory buffer.

17. The method of claim 16 wherein the input can be passed in multiple segments.

18. The method of claim 1 wherein the database transaction manager object further comprises an application programming interface (API), wherein the API can be called by other components of the information system.

19. The method of claim 1 wherein the database transaction manager object can be executed as a standalone utility program.

20. The method of claim 1 wherein the database transaction manager object comprises at least one of a system integrator or an application developer.

21. The method of claim 20 further comprising means for permitting use of the database transaction manager object with an integrator program.

22. The method of claim 20 further comprising means for creating a definition file for defining object types under a Cataloged object model, having at least one pre-defined query, transaction option, default setting, and an application programming interface (API).

23. The method of claim 22 further comprising means for expanding an application, or changing transactional requirements or defaults by changing the definition file, and regenerating and recompiling the respective product without changing the application software.

24. A tool for developing a customized information system wherein the information system utilizes:

(a) a database resource manager;

(b) at least one other resource manager; and (c) an application-independent, re useable generator that is based upon defined parameters, the generator being independent of the data base resource manager and the at least one other resource manager, the generator being configured for generating a database transaction manager object according to a specification provided by a system developer using the generator, the database transaction manager object being configured for specific use with the data base resource manager and the at least one other resource manager.

25. The tool of claim 24 wherein the database resource manager is a relational database management system.

26. The tool of claim 24 wherein the at least one other resource manager includes:

an object repository wherein objects are accessed by object identifications, a stream data server, a special-purpose information system, or a database resource manager.

27. The tool of claim 24 wherein the database transaction manager object follows a generic model for coordinating changes to data resources managed by the at least one other resource manager and to a portion of the database that references the other data resources.

28. The tool of claim 24 wherein the database transaction manager object permits loading of information into the system without writing a custom loader program.

29. An article of manufacture comprising a computer program carrier readable by a computer and embodying one or more instructions executable by the computer to perform a method for facilitating development of a customized information system wherein the system utilizes (a) a data base resource manager; and (b) an at least one other resource manager, the method comprising:

providing an application-independent, re-useable generator that is based upon defined parameters, the generator being independent of the data base resource manager and the at least one other resource manager, and generating a database transaction manager object according to a specification provided by a system developer using the generator, the database transaction manager object being configured for specific use with the data base resource manager and the at least one other resource manager.

* * * * *